United States Patent [19]

Sawicki

[11] 4,197,039
[45] Apr. 8, 1980

[54] COMBINED HOB

[75] Inventor: Sławomir Sawicki, Warsaw, Poland

[73] Assignee: Kombinat Przemyslu Narzedziowego "VIS" Osrodek Badawczo-Rozwojowy Narzedzi, Warsaw, Poland

[21] Appl. No.: 957,741

[22] Filed: Nov. 6, 1978

[30] Foreign Application Priority Data

Nov. 9, 1977 [PL] Poland .................................. 201995

[51] Int. Cl.² .......................... B26D 1/12; B24B 1/00; B21K 21/00
[52] U.S. Cl. ........................................ 407/25; 51/288; 76/101 A
[58] Field of Search ...................... 407/25, 26, 27, 28, 407/29, 30, 40, 41; 51/287, 288; 76/101 A

[56] References Cited

U.S. PATENT DOCUMENTS

| 75,219 | 3/1868 | Taylor | 407/29 |
| 82,402 | 9/1868 | Harrington | 407/29 |
| 3,245,134 | 4/1966 | Zorn | 407/25 |
| 3,283,449 | 11/1966 | Pinkowski | 51/288 |

Primary Examiner—Harrison L. Hinson
Attorney, Agent, or Firm—Haseltine, Lake & Waters

[57] ABSTRACT

A hob is formed of a body equipped with the seats of machining segments, each of the seats being profiled in a form of two mutually skew planes, where one plane is tangent to a cylinder circumscribed by a radius equal to 0.7 of a radius of the outer diameter of the hob, and the other plane forms with the first one an exterior acute angle, bigger than 30°. During sharpening of the hob, the machining segments rest on identical flat strips. The profiles of the seats in the body and the machining segments of the hob enable fixing of these segments both for the purpose of sharpening and for the operation in the same body, without an application of complicated mechanical catches.

3 Claims, 2 Drawing Figures

COMBINED HOB

BACKGROUND OF THE INVENTION

The subject of the present invention is a combined hob consisting of a body and numerous machining elements situated in the seats within the said body.

Known combined hobs are manufactured in a form of a cylindrical body containing the seats of rectangular sections, designed for fixing the machining segments. In order to make a microsection of the flank faces of the machining segments, strips of rectangular sections are fixed in the seats, with the aforesaid machining segments supported on the strips. The segments so located are offset from the center of the body, and the outer diameter of the tops of their profiles is bigger. The segments so assembled are subjected to grinding in order to shape their flank faces. Then the distance strips are removed and each of the aforesaid segments is fixed stably in the same seat, in place of the removed strips.

The segments so mounted form a hob whose diameter is smaller than it is during the machining of the flank faces of the said segments.

As a result of this operation, the required relief angle of each machining segment is obtained.

The seats of rectangular section in the body of the hob, containing at least two accurately parallel planes, require the machining segments with catching elements formed by the two parallel planes, accurately fitted to the seat with respect to parallelism and the distance between the planes. Maintenance of these parameters is expensive and especially increases the production costs. If these high requirements are not met, there is a decrease in the accuracy of hob mounting, which reduces its usefulness and strength. Both the seats and the catching elements of the machining segments have three planes mutually dependent on one another and requiring separate grinding.

SUMMARY OF THE INVENTION

The main object of the present invention is to eliminate the aforesaid disadvantages of the prior art.

The principal features of the invention has been achieved by a combined hob comprising a body and many machining segments located in the seats situated in said body, in which the seat of the machining segment is shaped in a form of two mutually skew planes, one of the planes being tangent to a cylinder circumscribed by a radius equal to 0.4 to 0.7 of the radius of the outer diameter of the hob, and the other plane forms with the first plane an exterior acute angle, bigger than 30°.

In order to increase the diameter of the hob during machining of the flank face of its machining segments, a distance element is placed on the plane forming an acute angle with the plane tangent to the said cylinder, then the machining segment is placed in a recess formed by an element and the remaining plane of the seat, and then is tightened to the said recess. This element can be made in a form of a flat plate with optional edges, or of any other object shaped like a rhomb, globules, or a roller.

The seats and the catching elements of the machining segments have only two planes each, both planes can be ground simultaneously with one grinding wheel. The only parameter required for obtaining an accurate connection between the machining segment and the seat is the angle between the planes forming the machining segment and the seat. Thus the necessity of separate machining of three planes mutually dependent on one another is eliminated.

The invention can best be understood with respect to the accompanying specification, claims and drawings.

IN THE DRAWINGS

DESCRIPTION OF THE INVENTION

Figure 1:
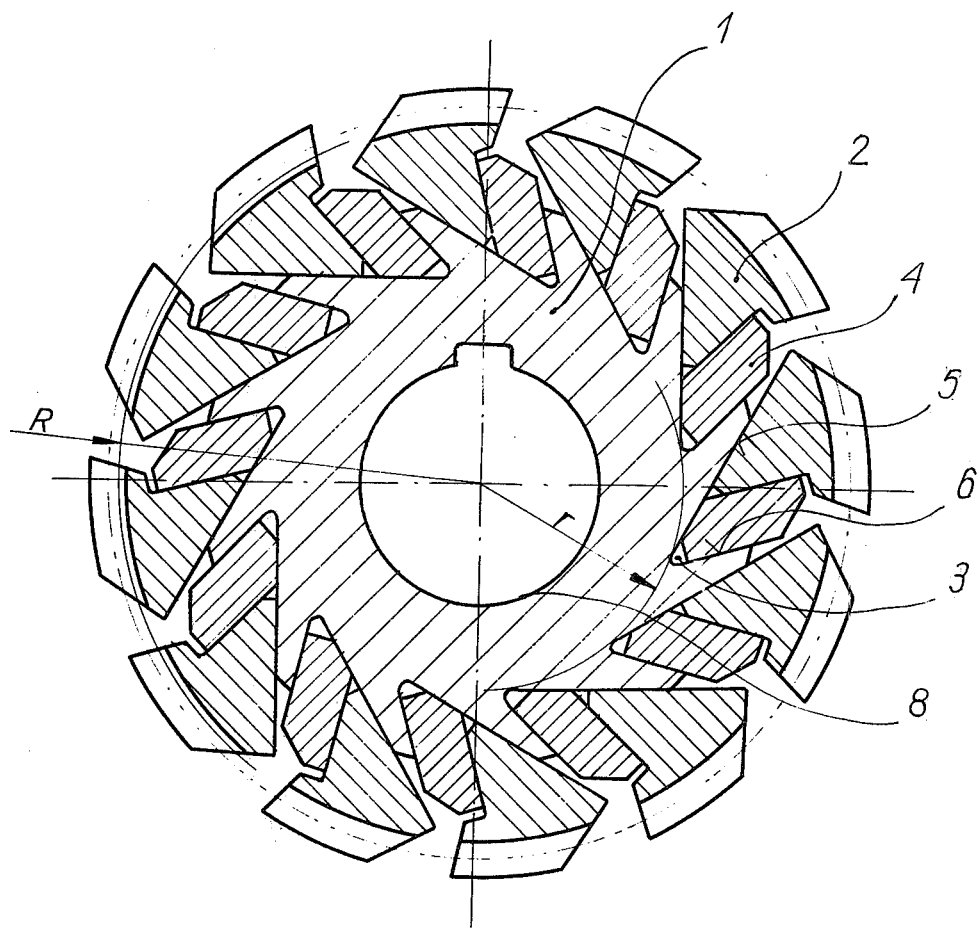
FIG. 1 shows the combined hob in the technological operation of machining.

The combined hob shown in FIG. 1 is used in the technological operation of machining, and consists of a body 1, in which there are many seats 3 arranged circumferentially on the outer cylindrical surface of the body, distance strips 4 and machining segments 2. The seat 3 has two planes, one plane 5 being tangent to a cylinder with a radius r equal to approximately 0.5 of the radius R of the final outer diameter of the hob, the other plane 6 is at an angle of 45° to the first one. The distance strips 4 are located in the seats 3, on the planes 6 of these seats and the machining segments 2 are located between these strips and the remaining planes 5. All distance strips have the same dimension from the plane adjacent to the plane 6 of the seat 3 to the opposite parallel plane. The fitting angle of the machining segment 2 is the same as the angle between planes 5 and 6 of the seat 3. The body of the hob is equipped with known fixing devices 8.

Figure 2:
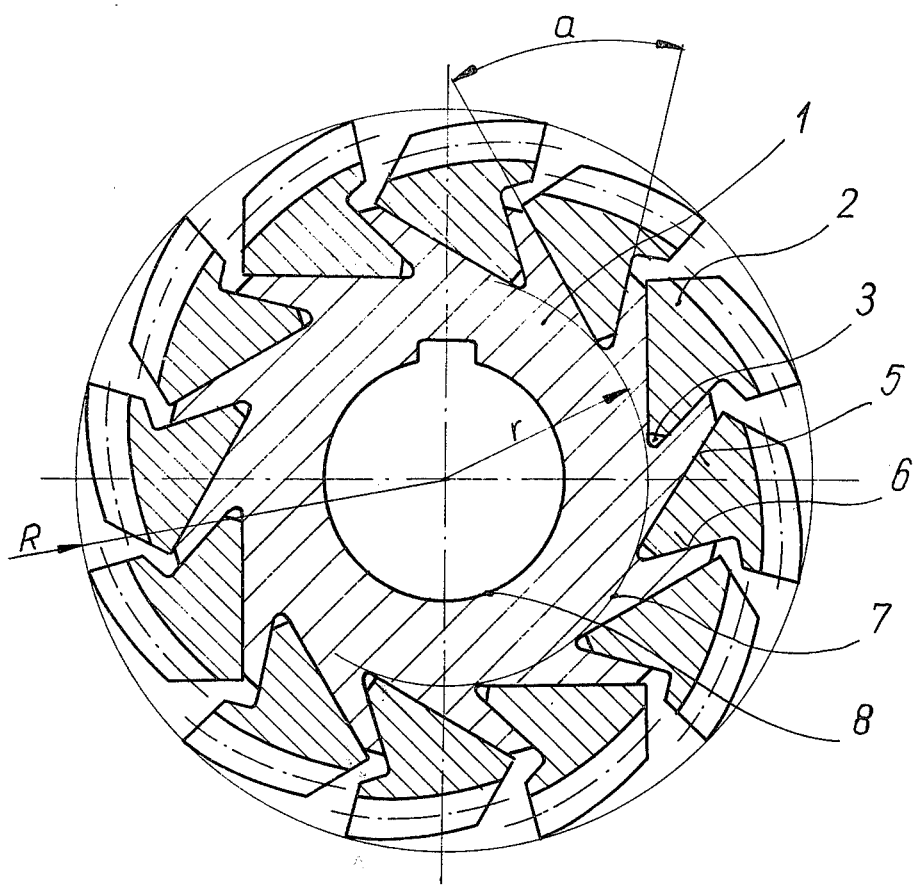
FIG. 2 shows the hob in its ready form.

FIG. 2 illustrates the compound hob in its ready form and consists of the body 1, in which there are many seats 3 arranged circumferentially on the outer circular surface of the body and the machining segments 2 located in these seats. The seat has two planes, one plane 5 being tangent to a cylinder with a radius r equal to approximately 0.5 of the radius R of the outer diameter of the hob, and the other plane 6 is at an angle of 45° to the first one. In the seats 3 on the planes 5 and 6 the machining segments 2 are stably fixed. During grinding of the flank face (per FIG. 1), of the machining segments 2, the segments and the distance strips 4 are rigidly connected to the body 1. The diameter of the worm during the grinding operation is bigger than the final diameter of the hob, circumscribed with the radius R. This increase of the diameter is obtained by means of the distance strips 4 described above. After making a profile of a worm on the machining segments 2, the distance strips 4 are removed and the machining segments 2 are stably fixed in the seats 3. The relief angle of the machining segments 2 of a ready hob, FIG. 2, formed as a result of the removal of the distance strips 4, depending, among other things, on the thickness of these distance strips, is appropriate for the expected machining parameters and is maintained to an adequate degree at the succeeding sharpening of the hob.

The above described design of the seat of the machining segment is simple in machining. The seat can be profiled accurately during one grinding operation by means of one profile grinding wheel. The technological distance strips 4 require only the maintenance of the dimension and parallelism of only two planes. Final assembling is easy, because it consists only in the application of either strips and segments, or only machining segments to the definite planes, with no necessity of parallel fitting in a rectangular seat.

It will be appreciated that various changes and modifications may be made in the foregoing apparatus without departing from the spirit of the present invention and as many changes may be made in the embodiments herein set forth it being understood that all matter described herein are to be interpreted as illustrative and not in a limiting sense.

I claim:

1. A hob assembly defined by a body having an outer cylindrical surface and a plurality of machining segments located in seats situated on said body wherein: a seat of said machining segments disposed in a body of the hob is profiled in a form of two mutually skew planes, a first of the planes being tangent to a cylinder circumscribed by a radius equal to 0.4 to 0.7 of a radius of an outer diameter of the hob, and the second plane forming with the first one, an exterior acute angle larger than 30°.

2. A hob assembly as claimed in claim 1, wherein: strips are located in respective seats on the second skew plane and machine segments are located between said strips and the first skew plane.

3. A hob assembly as claimed in claim 2, wherein: said strips have the same dimensions from a plane adjacent said second skew plane to an opposite parallel plane and a fitting angle of said machine segments is equal to the angle between the respective skew planes of said seat.

* * * * *